(12) United States Patent
Bauchot et al.

(10) Patent No.: US 8,106,776 B2
(45) Date of Patent: Jan. 31, 2012

(54) READING SHORT DISTANCE EMISSION RFID TAGS TO LOCATE ITEMS IN A CONTAINER

(75) Inventors: Frederic Bauchot, Saint-Jeannet (FR); Gerard Marmigere, Drap (FR); Joaquin Picon, St. Laurent du Var (FR); Pierre Secondo, Tourrettes-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 12/267,712

(22) Filed: Nov. 10, 2008

(65) Prior Publication Data

US 2010/0097184 A1    Apr. 22, 2010

(30) Foreign Application Priority Data

Oct. 16, 2008 (EP) .................................. 08305686

(51) Int. Cl.
*G08B 13/14* (2006.01)
(52) U.S. Cl. ................. 340/572.1; 340/572.4; 340/572.8
(58) Field of Classification Search ............... 340/572.1, 340/572.4, 572.8, 572.9, 539.1, 539.11, 539.12, 340/686.1, 10.1, 10.4, 10.42, 572.3; 235/385, 235/375; 206/470, 471, 504
See application file for complete search history.

(56) References Cited

U.S. PATENT DOCUMENTS

| | | | |
|---|---|---|---|
| 4,226,357 A | 10/1980 | Martin | |
| 6,237,772 B1 * | 5/2001 | LaMarche et al. | ............ 206/470 |
| 7,030,731 B2 | 4/2006 | Lastinger et al. | |
| 7,098,794 B2 * | 8/2006 | Lindsay et al. | ............ 340/572.3 |
| 7,212,121 B2 | 5/2007 | Hashimoto et al. | |
| 7,286,043 B2 * | 10/2007 | Carrender et al. | ......... 340/10.42 |
| 7,504,949 B1 * | 3/2009 | Rouaix et al. | ............... 340/572.1 |
| 7,639,119 B2 * | 12/2009 | Carrender et al. | ......... 340/10.42 |
| 7,768,409 B2 * | 8/2010 | Parias | ......................... 340/573.1 |
| 7,812,719 B2 | 10/2010 | Djuric et al. | |
| 2002/0196126 A1 | 12/2002 | Eisenberg et al. | |
| 2003/0227385 A1 | 12/2003 | Lancaster | |
| 2004/0212480 A1 | 10/2004 | Carrender et al. | |
| 2005/0275531 A1 | 12/2005 | Johnson | |
| 2006/0022038 A1 | 2/2006 | Hewlin et al. | |
| 2008/0303682 A1 | 12/2008 | Han | |
| 2009/0102661 A1 | 4/2009 | Barnes et al. | |

(Continued)

OTHER PUBLICATIONS

Trieu, U.S. Appl. No. 12/267,830, Office Action Communication, FR920080198US1, Dec. 9, 2010, 13 pages.

(Continued)

*Primary Examiner* — Van T. Trieu
(74) *Attorney, Agent, or Firm* — Douglas A. Lashmit; Hoffman Warnick LLC

(57) ABSTRACT

The present invention is directed to reading short distance emission RFID tags to locate items in a container. A method in accordance with an embodiment of the present invention includes: receiving, by a plurality of first RFID tags, a signal broadcast by an RFID reader, the signal initiating a reading sequence of the plurality of first RFID tags, wherein each first RFID taq is associated with a respective item located in the container, and wherein each first RFID tag emits an identification (ID); capturing the ID emitted by each first RFID tag using a plurality of second RFID tags located in a vicinity of the first RFID tag, wherein the IDs emitted by the first RFID tags are not captured by the RFID reader; the RFID reader interrogating the plurality of second RFID tags to obtain the captured IDs; and determining a physical location of an item in the container based on the captured IDs.

16 Claims, 5 Drawing Sheets

U.S. PATENT DOCUMENTS

2009/0322486 A1 12/2009 Gerstel
2010/0030667 A1* 2/2010 Chudy et al. .................... 705/28

OTHER PUBLICATIONS

Previl, U.S. Appl. No. 12/267,749, Office Action Communication, FR920080197US1, Jan. 31, 2011, 14 pages.
Trieu, Van Thanh, U.S. Appl. No. 12/267,830, Notice of Allowance & Fees Due, FR920080198US1, Apr. 8, 2011, 11 pages.
Previl, U.S. Appl. No. 12/267,749, Office Action Communication, FR920080197US1, May 6, 2011, 12 pages.
Trieu, U.S. Appl. No. 12/267,830, Supplemental Notice of Allowability, FR920080198US1, May 4, 2011, 2 pages.
Previl, U.S. Appl. No. 12/267,749, Notice of Allowance & Fees Due, Aug. 19, 2011, 7 pages.
Trieu, U.S. Appl. No. 12/267,830, Supplemental Notice of Allowability, Jun. 3, 2011, 4 pages.

* cited by examiner

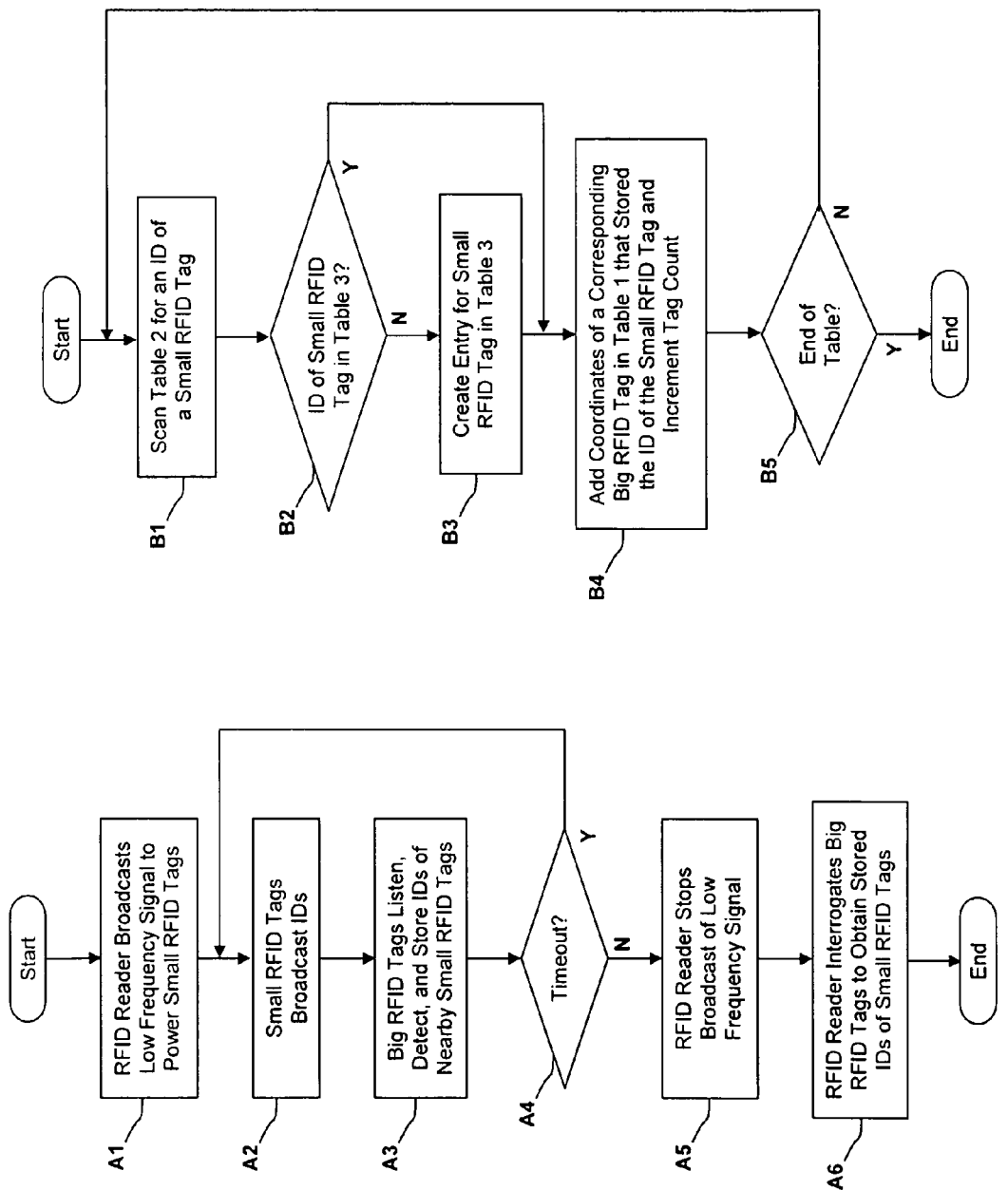

US 8,106,776 B2

READING SHORT DISTANCE EMISSION RFID TAGS TO LOCATE ITEMS IN A CONTAINER

CROSS-REFERENCE TO RELATED APPLICATIONS

This application is related in some aspects to co-pending patent application Ser. No. 12/267,830, filed Nov. 10, 2008, entitled "RFID Tag Positional Addressing," and co-pending patent application Ser. No. 12/267,749, filed Nov. 10, 2008, entitled "Method and Apparatus for Visually Locating Short Distance Emission RFID Tags to Locate Items in a Container," which are hereby incorporated by reference.

FIELD OF THE INVENTION

The present invention relates to radio frequency identification (RFID) tags. More specifically, the present invention is directed to a method and apparatus for reading short distance emission RFID tags to locate items in a container.

BACKGROUND OF THE INVENTION

In several industries, product items may be equipped with an RFID tag. When the item is relatively small, the size of the RFID tag must be adapted and becomes very small itself. One consequence of its small size is a small emission distance, which makes it difficult to read the information in the RFID tag. When a plurality of such items are stored together in a comparmentalized manner, it is difficult to determine in which compartment a given item has been stored such that it can be easily retrieved.

SUMMARY OF THE INVENTION

The present invention is directed to a method and apparatus for reading short distance emission RFID tags to locate items in a container.

A first aspect of the present invention is directed to a method for reading short distance emission radio frequency identification (RFID) tags to locate items in a container, comprising: receiving, by a plurality of first RFID tags, a signal broadcast by an RFID reader, the signal initiating a reading sequence of the plurality of first RFID tags, wherein each first RFID taq is associated with a respective item located in the container, and wherein each first RFID tag emits an identification (ID); capturing the ID emitted by each first RFID tag using a plurality of second RFID tags located in a vicinity of the first RFID tag, wherein the IDs emitted by the first RFID tags are not captured by the RFID reader; the RFID reader interrogating the plurality of second RFID tags to obtain the captured IDs; and determining a physical location of an item in the container based on the captured IDs.

A second aspect of the present invention is directed to a system for reading short distance emission radio frequency identification (RFID) tags to locate items in a container, comprising: an RFID reader for broadcasting a signal to a plurality of first RFID tags, the signal initiating a reading sequence of the plurality of first RFID tags, wherein each first RFID taq is associated with a respective item located in the container, and wherein each first RFID tag emits an identification (ID); a plurality of second RFID tags located in a vicinity of each first RFID tag for capturing the ID emitted by each first RFID tag, wherein the IDs emitted by the first RFID tags are not captured by the RFID reader; the RFID reader interrogating the plurality of second RFID tags to obtain the captured IDs; and a system for determining a physical location of an item in the container based on the captured IDs.

A third aspect of the present invention is directed to a container, comprising: a plurality of compartments, each compartment comprising a plurality of faces; and an RFID tag provided on each face of each compartment.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

FIGS. 4 and 5 depict illustrative processes for determining the data Tables 2 and 3 in accordance with an embodiment of the present invention.

Figure 1:
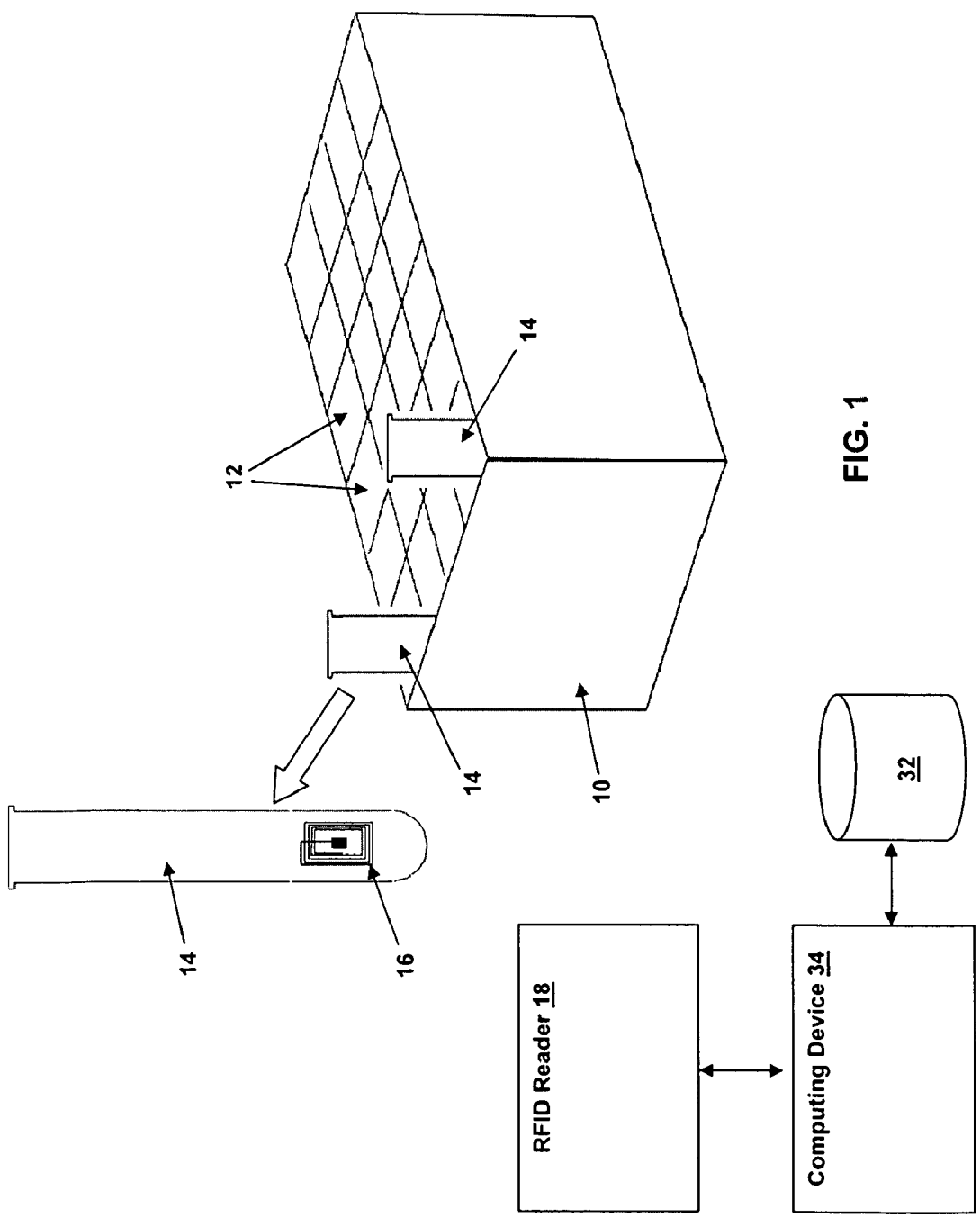
FIG. 1 depicts a system for reading short distance emission RFID tags to locate items in a container in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention is directed to a method and apparatus for reading short distance emission RFID tags to locate items in a container.

As depicted in FIG. 1, a container 10 (e.g., a box) is divided into a plurality of compartments 12 (e.g., rectangular in shape) in which items 14 are stored. In this example, the items 14 comprise small test tubes containing samples, while the container 10 and the compartments 12 are rectangular in shape. However, it will be apparent to one skilled in the art that the present invention can be applied in any type of environment to any type of container containing any type of item(s).

Each item 14 is equipped with an RFID tag 16 that has a very short emission range. To this extent, the emission range is not sufficient to allow an RFID reader 18 to read a given RFID tag 16 without moving the antenna of the RFID reader 18 in the vicinity the RFID tag 16. The RFID tags 16 can be provided on the items 14 using any now known or later developed methodology.

Figure 2:
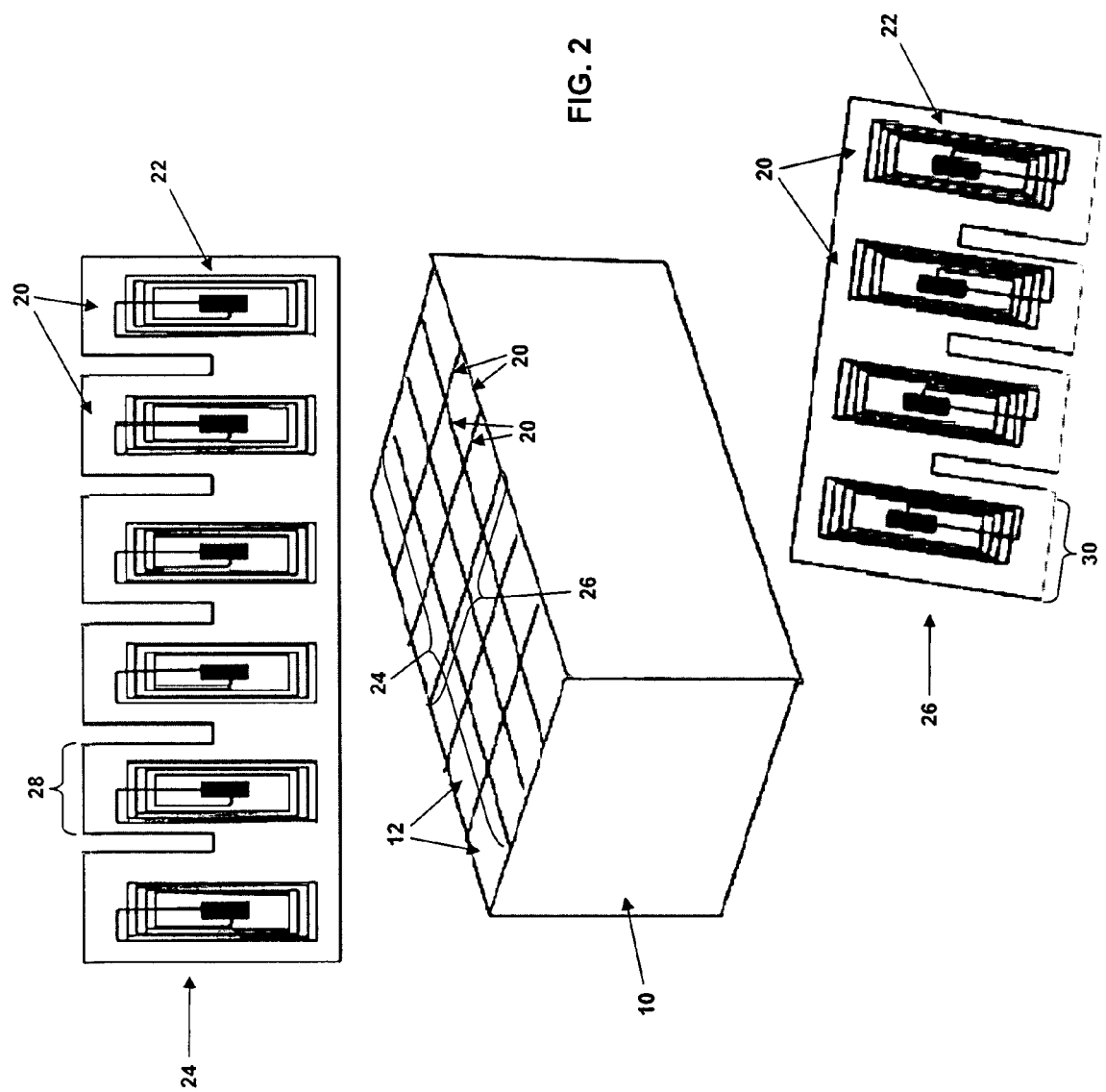
FIG. 2 depicts an illustrative container in accordance with an embodiment of the present invention.

As depicted in FIG. 2, each compartment 12 of the container 10 has a plurality of faces 20. The faces 20 of the compartments 12 are equipped with RFID tags 22. Unlike the RFID tags 16, however, the RFID tags 22 have a larger emission range that is sufficient to allow the RFID reader 18 to read the RFID tags 22. The RFID tags 22 can be provided on the faces 20 of the compartments 12 using any now known or later developed methodology.

In this embodiment, the compartments 12 are formed using a plurality of first and second dividers 24, 26, wherein the first dividers 24 comprise a plurality of fingers 28, while the second dividers 26 comprise a plurality of fingers 30. When the first and second dividers 24, 26 are positioned in the container 10, the plurality of fingers 28, 30 form the faces 20 of the compartments 12. An RFID tag 22 is provided on at least one side of each finger 28, 30. Other techniques for forming the compartments 12 are within the purview of one skilled in the art.

The identities and locations of the RFID tags 22 are known and can be used to determine the physical location of items 14 stored in the container 10. When the RFID reader 18 starts a reading sequence, each RFID tag 16 answers. The response from a given RFID tag 16 on an item 14, which includes an ID of the RFID tag 16, is not received by the RFID reader 18, but is captured and stored by the RFID tags 22 located around the item 14 in the container 10. When the RFID tags 22 are subsequently interrogated by the RFID reader 18, each RFID tag 22 provides its own ID and the IDs of nearby RFID tags 16. Using this information, the present invention can determine the location of any item 14 stored in the container 10. This process is described in further detail below.

In accordance with an embodiment of the present invention, this reading process occurs in two phases. In a first phase, the RFID tags 16 are powered by the RFID reader 18, and emit their IDs at a random pace in a given period. During this phase, the RFID tags 22 listen to and capture the IDs emitted by the RFID tags 16. However, during this phase, the RFID tags 22 do not communicate with the RFID reader 18. In a second phase, the RFID reader 18 interrogates the RFID tags 22, and each RFID tag 22 reports its ID and provides a list of the IDs of the RFID tags 16 it captured during the first phase.

Figure 3:
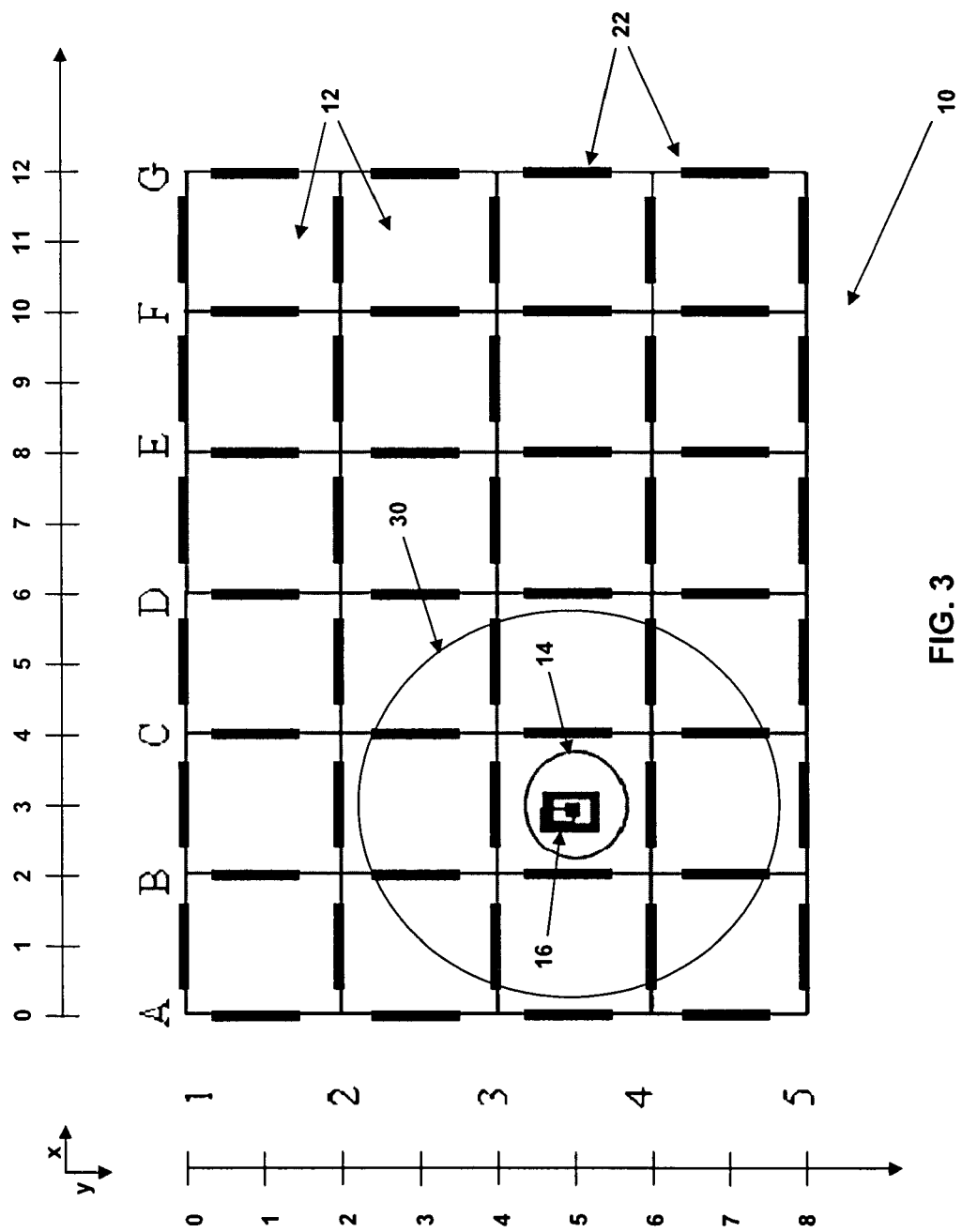
FIG. 3 depicts a plan view of the container of FIG. 2, in accordance with an embodiment of the present invention.

A plan view of a container 10 is depicted in FIG. 3. As shown, the portions (e.g., sides/dividers) of the container 10 extending vertically in FIG. 3 are labeled using the letters A, B, C, . . . , while the portions (e.g., sides/dividers) of the container 10 extending horizontally in FIG. 3 are labeled using the numbers 1, 2, 3, . . . . Each RFID tag 22 located on a horizontally-extending portion of the container 10 is named using the line number associated with that portion, followed by the two letters of the vertically-extending portions that enclose the RFID tag 22. For instance, the RFID tag 22 located on the horizontally-extending portion designated "1" between the vertically-extending portions designated "A" and "B", is named "1AB". In a similar manner, each RFID tag 22 located on a vertically-extending portion of the container 10 is named using the letter associated with that portion, followed by the two numbers of the horizontally-extending portions that enclose the RFID tag 22. For instance, the RFID tag 22 located on the vertically-extending portion designated "A" between the horizontally-extending portions designated "2" and "3", is named "A23". Based on this naming convention, the RFID tag 16 on an item 14 in the container 10 is identified by the two letters and two numbers of the portions of the container 10 that enclose the item 14. For example, the item 14 shown in the container 10 in FIG. 3 is identified as "BC34".

FIG. 3 depicts an item 14 in the container 10 with an RFID tag 16 identified as BC34 emitting a signal, which has a low range of coverage 30. The RFID tags 22 designated B23, C23, 3AB, 3BC, 3CD, B34, C34, 4AB, 4BC, 4CD, B45 and C45 are within the range of coverage 30 of the RFID tag 16 and receive the signal emitted by the RFID tag 16 identified as BC34. The coordinates (x,y) of the RFID tags 22 designated B23, C23, 3AB, 3BC, 3CD, B34, C34, 4AB, 4BC, 4CD, B45 and C45 are (2,3), (4,3), (1,4), (3,4), (5,4), (2,5), (4,5), (1,6), (3,6), (5,6), (2,7), (4,7), respectively.

The (x,y) coordinates of the item 14 in the container 10 in FIG. 3 are calculated as follows:

$$\text{Item\_TagX} = \frac{\sum X}{\text{Tag\_count}} \quad (\text{EQU. 1})$$

and $$\text{Item\_TagY} = \frac{\sum Y}{\text{Tag\_count}} \quad (\text{EQU. 2})$$

where
Item_TagX is the x coordinate of the item 14;
Item_TagY is the y coordinate of the item 14;
SumX is the sum of the x coordinates of the RFID tags 22;
SumY is the sum of the y coordinates of the RFID tags 22; and
Tag_Count is the number of RFID tags 22 within the range of coverage 30.

In FIG. 3, based on the above equations, the (x,y) coordinates of the item 14 in the container 10 are determined to be:
x=36/12=3; and
y=60/12=5.
Thus, the location of the item 14 in the container 10 in FIG. 3 is (3,5).

The (x,y) coordinates of each item 14 in the container 10 can be calculated and stored in a storage device 32 using a computing device 34 coupled to the RFID reader 18 (FIG. 1). Using the coordinate data, a user can easily locate a desired item 14 in the container 10 for retrieval. The coordinate data can be determined and stored, for example, using a plurality a tables as detained below. Table 1, for instance, provides the (x,y) coordinates of each RFID tag 22 ("Big RFID Tag") in the container 10.

TABLE 1

| Big RFID Tag ID | X | Y |
|---|---|---|
| B23 | 2 | 3 |
| C23 | 4 | 3 |
| 3AB | 1 | 4 |
| 3BC | 3 | 4 |
| B34 | 2 | 5 |
| 4BC | 3 | 4 |
| ... | ... | ... |

Table 2 identifies the RFID tags 16 (Small RFID Tag) detected by each RFID tag 22 (Big RFID Tag).

TABLE 2

| Big RFID Tag ID | Small RFID Tag ID | Small RFID Tag ID | Small RFID Tag ID |
|---|---|---|---|
| B34 | BC34 | AB34 | ... |
| 4BC | BC34 | BC23 | ... |
| ... | ... | ... | ... |

A flow diagram of an illustrative process for determining the data in Table 2 in accordance with an embodiment of the present invention is depicted in FIG. 4. At A1, the RFID reader 18 broadcasts a low frequency signal to provide power to the RFID tags 16 ("Small RFID tags" in FIG. 4) located on the items 14 in the container 10. At A2, the RFID tags 16 broadcast their IDs using dual frequency technology. At A3, the RFID tags 22 ("Big RFID tags" in FIG. 4) listen, detect, and store the IDs of nearbly RFID tags 16. If a timout occurs (YES, A4), flow returns to A2. If a timeout does not occur (N0, A4), flow passes to A5. At A5, the RFID reader 18 stops broadcasting the low frequency signal. At A6, the RFID reader 18 interrogates the RFID tags 22 to determine the RFID tags 16 detected by each RFID tag 22 to provide the data for Table 2.

Table 3 identifies the (x,y) coordinates of each item 14 in the container 10. The (x,y) coordinates of a given item 14 are calculated (e.g., by the computing device 34, FIG. 1) in accordance with EQUS. 1 and 2 using the data from Tables 1 and 2.

TABLE 3

| Small RFID Tag ID | Small RFID Tag x | Small RFID Tag x | Tag Count |
|---|---|---|---|
| BC34 | B34x + 4BCx + ... = 36/12 | B34y + 4BCy + ... = 60/12 | B34, 4BC, ... = 12 |
| ... | ... | ... | ... |

A flow diagram of an illustrative process for determining the data in Table 3 in accordance with an embodiment of the present invention is depicted in FIG. 5. At B1, the data in Table 2 is scanned for an ID of a given RFID tag 16 ("Small RFID tag in FIG. 5). At B2, if the ID of the RFID tag 16 is not present in Table 3 (N0, B2), flow passes to B3 at which an entry for the RFID tag 16 is created. If the ID of the RFID tag 16 is present in Table 3 (YES, B2), then flow passes to B4 at which the coordinates of a corresponding RFID tag 22 ("Big RFID tag in FIG. 5) in Table 1 that has stored the ID of the RFID tag 16 are summed (see, e.g. EQUS. 1 and 2) and the tag count is incremented. If the end of Table 2 has been reached (YES, B5), the process ends. If the end of Table 2 has not been reached (N0, B5), flow passes back to B1. Using the coordinate data in Table 3, a user can easily determine the (x,y) coordinates of any item 14 in the container 10.

Figure 6:
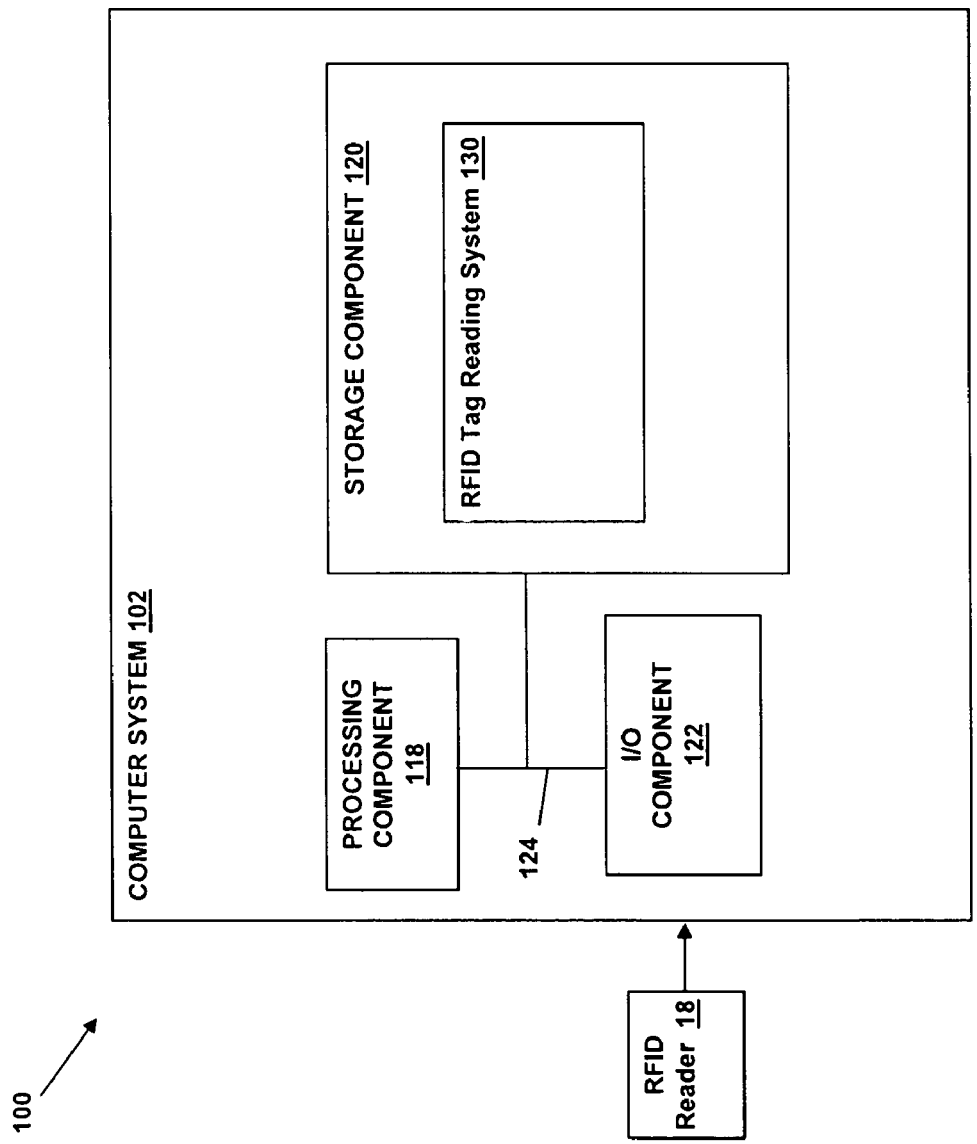
FIG. 6 depicts an illustrative computer system for implementing embodiment(s) of the present invention.

FIG. 6 depicts an illustrative system 100 for reading short distance emission RFID tags in accordance with any/all embodiments of the present invention. The system 100 includes a computer infrastructure 102 that can perform the various processes described herein. The computer infrastructure 102 is shown including a computer system 104.

The computer system 104 is shown as including a processing unit 108, a memory 110, at least one input/output (I/O) interface 114, and a bus 112. Further, the computer system 104 is shown in communication with at least one external device 116 and a storage system 118. In general, the processing unit 108 executes computer program code, such as an RFID tag reading system 130, that is stored in memory 110 and/or storage system 118. While executing computer program code, the processing unit 108 can read and/or write data from/to the memory 110, storage system 118, and/or I/O interface(s) 114. Bus 112 provides a communication link between each of the components in the computer system 104. The external device(s) 116 can comprise any device (e.g., RFID reader 18) that enables a user to interact with the computer system 104 or any device that enables the computer system 104 to communicate with one or more other computer systems.

The computer system 104 can comprise any general purpose computing article of manufacture capable of executing computer program code installed by a user (e.g., a personal computer, server, handheld device, etc.). However, it is understood that the computer system 104 is only representative of various possible computer systems that may perform the various processes of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and/or storage system 118 (e.g., a fixed disk, a read-only memory, a random access memory, a cache memory, etc.).

In another embodiment, the invention provides a business method that performs the processes of the invention on a subscription, advertising, and/or fee basis. A service provider can create, maintain, support, etc., a computer infrastructure, such as the computer infrastructure 102, that performs the processes of the invention for one or more customers. In return, the service provider can receive payment from the customer(s) under a subscription and/or fee agreement and/or the service provider can receive payment from the sale of advertising space to one or more third parties.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the embodiments of this invention has been presented for purposes of illustration and description. It is not intended to be exhaustive or to limit the invention to the precise form disclosed, and obviously, many modifications and variations are possible.

What is claimed is:

1. A method for reading short distance emission radio frequency identification (RFID) tags to locate items in a container, comprising:
    receiving, by a plurality of first RFID tags, a signal broadcast by an RFID reader, the signal initiating a reading sequence of the plurality of first RFID tags, wherein each first RFID tag is associated with a respective item located in the container, and wherein each first RFID tag emits an identification (ID);
    capturing the ID emitted by each first RFID tag using a plurality of second RFID tags located in a vicinity of the first RFID tag, wherein the IDs emitted by the first RFID tags are not captured by the RFID reader;
    the RFID reader interrogating the plurality of second RFID tags to obtain the captured IDs; and
    determining a physical location of an item in the container based on the captured IDs.

2. The method of claim 1, wherein the second RFID tags have a larger emission range than the first RFID tags.

3. The method of claim 1, wherein the container comprises a plurality of compartments, each compartment comprising a plurality of faces, further comprising:
providing each face of each compartment of the container with a second RFID tag.

4. The method of claim 3, further comprising:
obtaining coordinates of the second RFID tags within the container.

5. The method of claim 4 further comprising:
determining the physical location of an item in the container based on the coordinates of the second RFID tags that captured the ID of the first RFID tag associated with the item.

6. The method of claim 5, further comprising:
storing the physical locations of each item in the container; and
retrieving an item from the container based on the stored physical location of the item.

7. The method of claim 3, wherein the compartments are rectangular.

8. The method of claim 7, further comprising:
forming the compartments using a plurality of dividers, wherein each divider comprises a plurality of fingers; and
forming the faces of the compartments using a plurality of the fingers of the dividers.

9. A system for reading short distance emission radio frequency identification (RFID) tags to locate items in a container, comprising:
an RFID reader for broadcasting a signal to a plurality of first RFID tags, the signal initiating a reading sequence of the plurality of first RFID tags, wherein each first RFID tag is associated with a respective item located in the container, and wherein each first RFID tag emits an identification (ID);
a plurality of second RFID tags located in a vicinity of each first RFID tag for capturing the ID emitted by each first RFID tag, wherein the IDs emitted by the first RFID tags are not captured by the RFID reader;
the RFID reader interrogating the plurality of second RFID tags to obtain the captured IDs; and
a system for determining a physical location of an item in the container based on the captured IDs.

10. The system of claim 9, wherein the second RFID tags have a larger emission range than the first RFID tags.

11. The system of claim 9, wherein the container comprises a plurality of compartments, each compartment comprising a plurality of faces, and wherein each face of each compartment of the container is provided with a second RFID tag.

12. The system of claim 11, further comprising:
a system for obtaining coordinates of the second RFID tags within the container.

13. The system of claim 12, further comprising:
a system for determining the physical location of an item in the container based on the coordinates of the second RFID tags that captured the ID of the first RFID tag associated with the item.

14. The system of claim 13, further comprising:
a system for storing the physical locations of each item in the container, wherein an item can be retrieved from the container based on the stored physical location of the item.

15. The system of claim 11, wherein the compartments are rectangular.

16. The system of claim 15, further comprising:
a plurality of dividers for forming the compartments, wherein each divider comprises a plurality of fingers, and wherein the fingers form the faces of the compartments.

* * * * *